J. M. Chaplin,
Wire Stretcher,
No. 83,038.     Patented Oct. 13, 1868.
Fig. 1
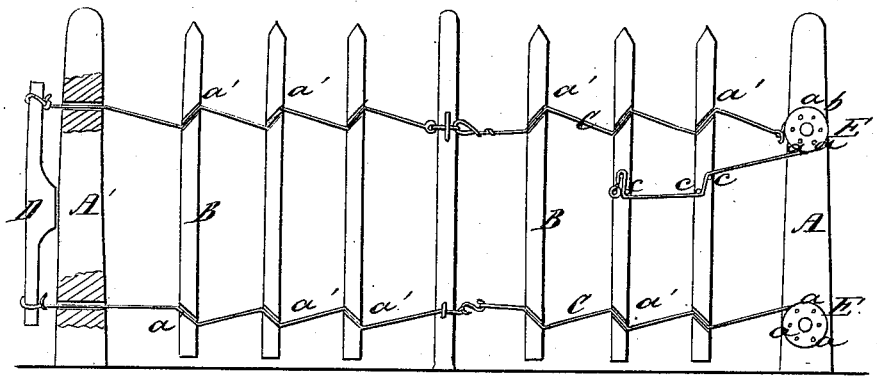
Fig. 2     Fig. 3
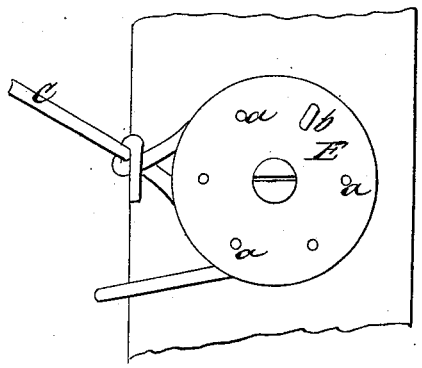 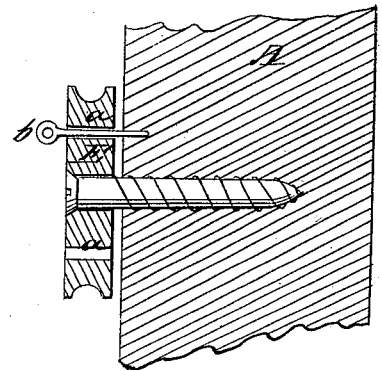
Fig. 4
Witnesses
Wm Dean Overell
G. C. Cotton
Inventor
J. M. Chaplin
per Munn & Co
Attorneys

J. M. CHAPLIN, OF MIDDLEPORT, NEW YORK.

Letters Patent No. 83,038, dated October 13, 1868.

IMPROVEMENT IN FENCE.

The Schedule referred to in these Letters Patent and making part of the same.

*To all whom it may concern:*

Be it known that I, J. M. CHAPLIN, of Middleport, in the county of Niagara, and State of New York, have invented a new and improved Fence; and I do hereby declare that the following is a full, clear, and exact description thereof, which will enable those skilled in the art to make and use the same, reference being had to the accompanying drawings, forming part of this specification.

This invention relates to a new and improved fence, of that class in which the pickets are attached to wires.

The invention relates to a new and improved manner of straining the wires, and attaching the pickets thereto, as hereinafter fully shown and described, whereby a strong, durable, and economical fence is obtained.

In the accompanying sheet of drawings,

Figure 1 is a side view of my invention.

Figure 2, an enlarged side view of a portion of the same.

Figure 3, a section of fig. 2, taken in the line x x.

Figure 4, a detached view of a crank pertaining to the same.

Similar letters of reference indicate corresponding parts.

A A' represent the main posts of the fence, which are sunk into the ground as usual, and B represents the pickets, which have oblique slots, a', made in them to receive the wires C C.

These wires are secured at one end to opposite ends of a wooden spring, D, which is attached to post A'.

The other ends of the wires are attached to wheels, E E, secured to the post A.

These wheels are perforated with holes, a, through any of which a pin, b, passes into post A, to hold the wheels, and keep the wires in a proper state of tension, and by turning these wheels, the wires may be strained or drawn as tight as desired.

The wooden spring D compensates for the expansion and contraction of the wires, and will always keep the latter in a taut state, while the oblique slots a' prevent the pickets from moving laterally on the wires.

In lieu of these oblique slots, pins, c, may be used, and driven into the pickets, as shown in fig. 1, the same result being attained in either case.

In order to turn the wheels E E, I employ a wrench, d, as shown in fig. 4, said wrench being provided with pins, e e, to fit into two of the holes in the wheels.

I claim as new, and desire to secure by Letters Patent—

The wires C C, with the wheels E E, spring D, and pickets B, all arranged in connection with the posts A A'; substantially as and for the purpose set forth.

J. M. CHAPLIN.

Witnesses:
  HENRY PHELPS,
  H. WARREN.